(Model.)

2 Sheets—Sheet 2.

R. C. MORRIS.
GRAIN DRILL.

No. 251,724. Patented Jan. 3, 1882.

Witnesses.
A. Ruppert.
C. M. Connell

R. C. Morris
Inventor.
Holloway & Blanchard
Attys

N. PETERS. Photo-Lithographer. Washington, D. C.

UNITED STATES PATENT OFFICE.

ROBERT C. MORRIS, OF OLNEY, ILLINOIS.

GRAIN-DRILL.

SPECIFICATION forming part of Letters Patent No. 251,724, dated January 3, 1882.

Application filed April 13, 1881. (Model.)

*To all whom it may concern:*

Be it known that I, ROBERT C. MORRIS, a citizen of the United States, residing at Olney, in the county of Richland and State of Illinois, have invented certain new and useful Improvements in Grain-Drills; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in grain-drills; and the objects of my improvements are, first, to provide a machine for drilling wheat and other kinds of grain, the weight of which shall rest mainly upon the shovels which form the furrows into which the grain is deposited, or upon an attachment thereto, whereby the operator is enabled to control the depth of the furrow, and consequently the distance below the general surface of the ground at which the seeds shall be deposited, whether such ground be soft or hard; second, to provide a series of rollers which shall follow the shovels and compact the earth upon the grain after it has been deposited in the furrow, and at the same time leave a groove in the ground to be filled with earth after the machine has passed it, by the action of the elements; third, to provide a suitable form of cutter to be placed in advance of the shovels and seed-conducting tubes, that shall cut away weeds, grass, corn-stalks, and other similar substances, and thus prevent the shovels from being lifted out of the ground or out of their proper positions thereby, and at the same time cause the shovels to be raised when coming in contact with roots of trees, stones, or other substances that would injure the machine if the shovels were not raised; fourth, to provide coiled springs for holding the shovels in the earth when there are no obstructions in their path, and permitting them to rise when such obstructions present themselves; and, fifth, to provide the necessary construction and combination of parts to make the machine operative, and to provide for stopping the flow of grain from the seed-box at the ends of the route and when the machine is being moved from place to place. I accomplish these objects by the mechanism and combinations illustrated in the accompanying drawing and hereinafter described.

Figure 1:
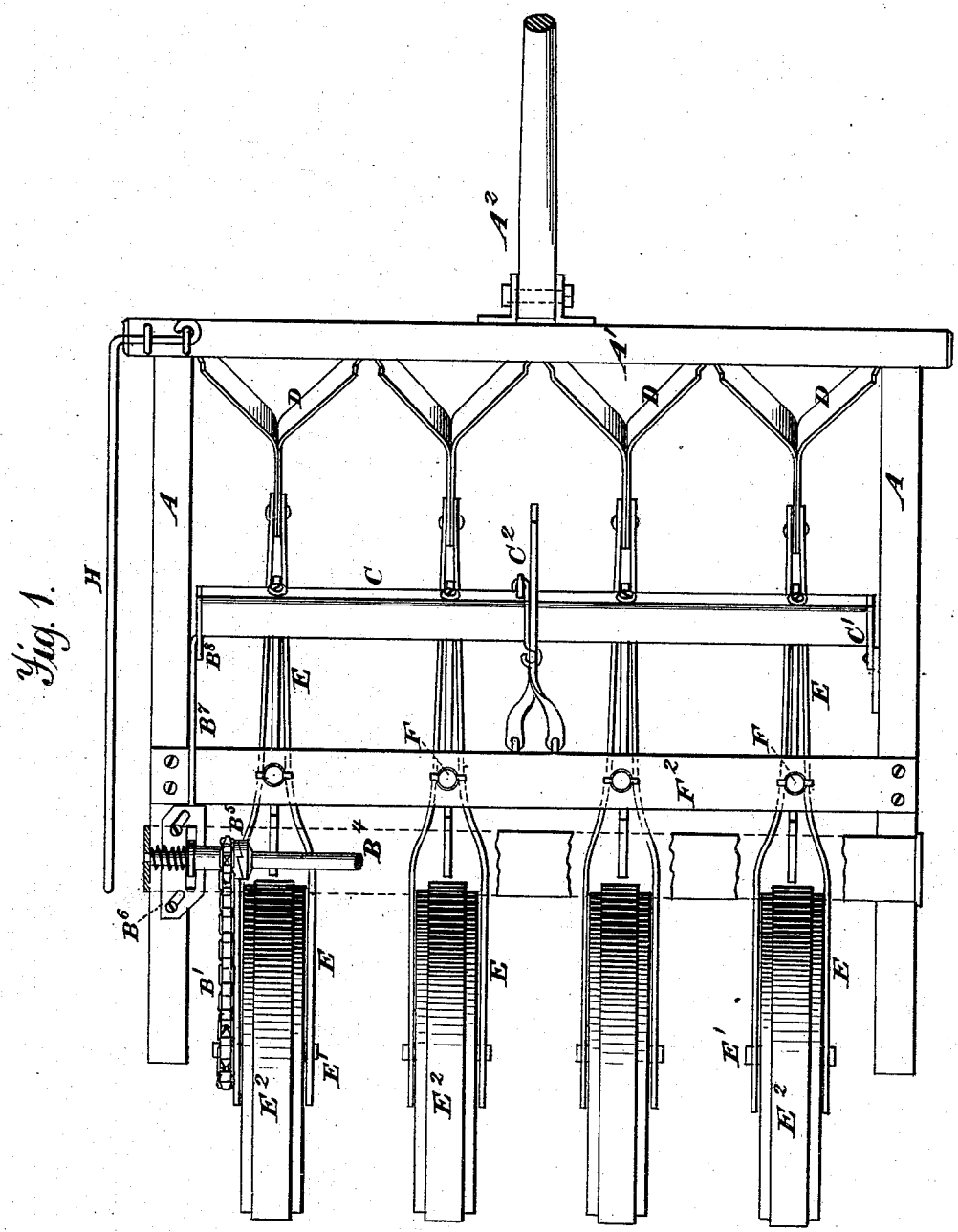
Figure 2:
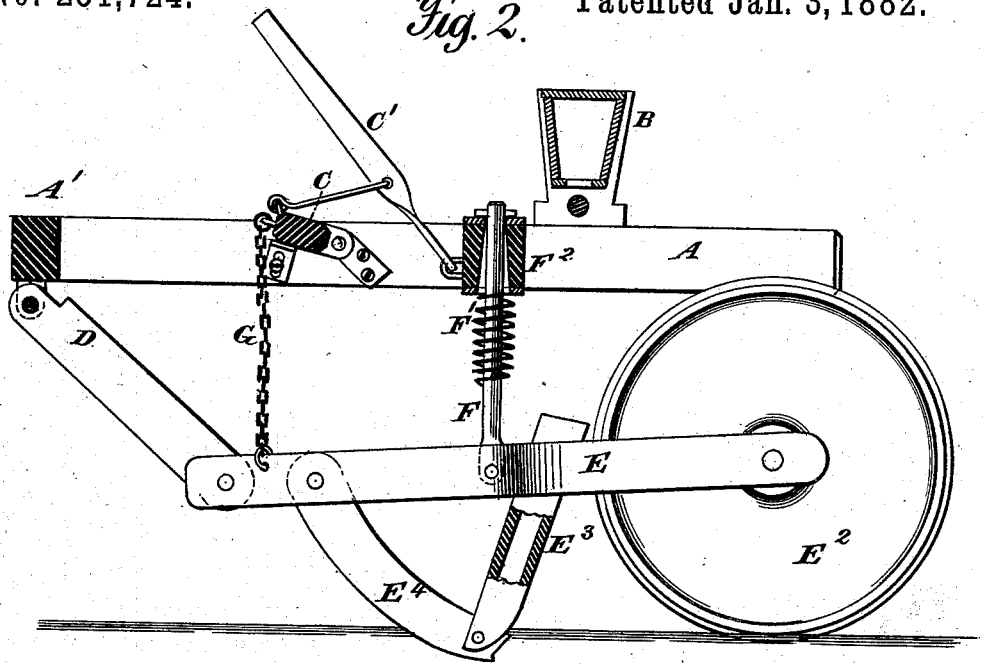
Figure 3:
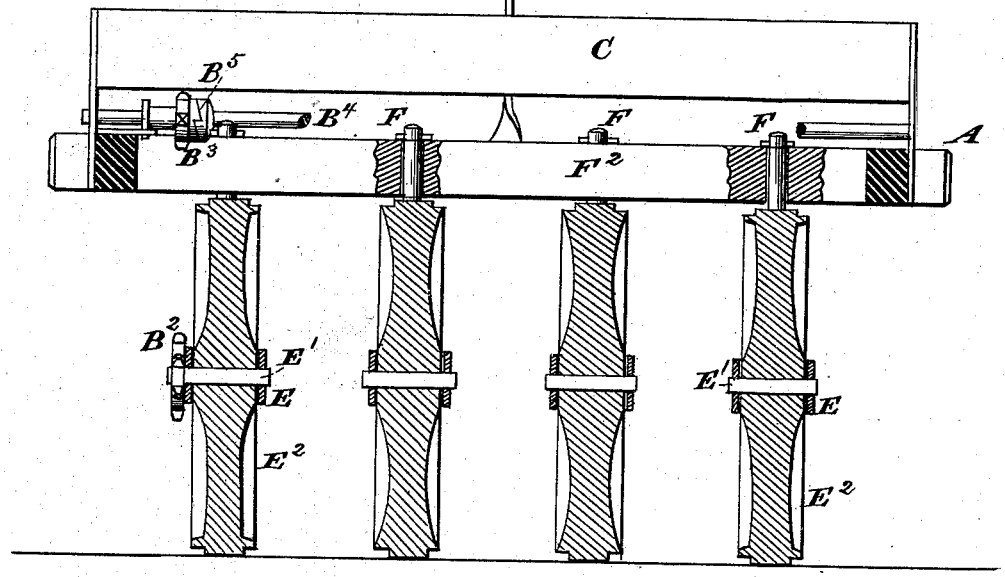

Figure 1 is a plan view of so much of a grain-drill as is necessary to illustrate my improvements, it showing a frame to which the shovels and rollers are attached, a seed box, mechanism for operating the feeding wheels or slides, mechanism for elevating the shovels, and a guide-rod for indicating the proper position of the machine as it is being drawn through the field. Fig. 2 is an elevation, partly in section, showing the frame, one of the shovels, a roller, a jointed bar to which the shovel and roller are attached, the mechanism for elevating the shovels and the cutters, the latter being shown in position, and a spring for allowing the shovels to be raised when coming in contact with an obstruction; and Fig. 3 is a rear end view, showing the frame, the rollers, the bars to which they are secured, the beams to which the rods which carry the springs for allowing the shovels to have an automatic movement imparted to them are secured, and the mechanism for moving the feed wheels.

Similar letters refer to similar parts throughout the several views.

Grain-drills as at present constructed are faulty, in that there is no adequate means provided for preventing them from depositing the seed in the ground at unequal depths. If the ground is soft, the grain is apt to be buried too deep, thus frequently preventing it from germinating and causing it to rot in the earth; and if the ground is very hard the furrows are made so shallow that the grain has not sufficient earth over it to prevent its being dried up by the sun or picked up and carried away by birds.

The purpose of my present improvements is to provide a machine which shall to a great extent, if not wholly, be free from such objections.

In constructing machines according to my improved plan there is provided a frame, A, which transversely may be of any desired width in order that it may receive and support any chosen number of shovels and their rollers. This frame may be of wood or of iron, it consisting of side beams, A A, and a front beam, A', to which the tongue A² is attached, as shown in Fig. 1, where it will be observed that it is pivoted to said beam in such a manner that the necks of the horses are relieved from the weight of any portion of the frame of the machine and are only required to support one-half of the weight of the tongue.

Should it be found, in using this machine in very soft ground, that too much weight is thrown upon the necks of the animals, caster or carrying wheels so arranged as to turn freely can be placed at the forward corners of the frame, which will obviate the difficulty.

At the proper point in front of the rollers soon to be described there is placed upon the side beams, A A, a seed-box, B, which may be of any approved form and capacity and provided with any preferred form of feeding devices, such devices, when in operation, being driven by an endless chain, B', passing over a sprocket-wheel, B$^2$, secured upon the axle of one of the rollers; or, if preferred, more than one such chain and wheel may be used. The chain B', at its upper end, passes over a wheel, B$^3$, which is secured and allowed to slide upon the shaft B$^4$, which in practice is made to extend across the machine and within the seed-box when the grain is fed out thereof by rotating wheels.

Upon the shaft B$^4$ there is placed a portion of a clutch, B$^5$, the opposite portion of which is formed upon the face of the wheel B$^3$, the part B$^5$ being firmly secured to the shaft B$^4$. These last-described parts are for the purpose of driving the feed-wheels, and their arrangement is as shown in order that when the machine arrives at the end of its route, or at other times when it is not desirable to have grain fed from the seed-box, the wheel B$^3$ of the clutch can be slid upon the axle upon which it is carried, which, when moved outward, will have the effect to stop the rotation of the feed-wheels and allow them to remain in a state of rest until it is again moved into contact with the part B$^5$.

The requisite movement is imparted to the wheel B$^3$ by means of a sliding plate, B$^6$, which is provided with two or more angular slots, as shown in Fig. 1, through which bolts pass into the frame, so that as said plate is moved backward and forward a transverse as well as a longitudinal movement will be imparted to it, and as projections are formed upon it which enter an annular groove formed in the neck of the wheel B$^3$, it follows that it will impart to said wheel the required movement.

From the forward end of plate B$^6$ there extends a rod, B$^7$, the outer end of which is attached to an arm, B$^8$, which is attached to tumbling-beam C, pivoted to the parts A A of the frame, as shown in Fig. 1, by means of the arms B$^8$ and C', its arrangement being such that as it is tilted forward by the lever C$^2$ it will cause the wheel B$^3$ to be carried into contact with the clutch B$^5$.

To the front beam, A', there is pivoted a series of bars, D D, their number being equal to the number of shovels it is determined to use in the drill. These bars are, by preference, made of light strips of metal riveted together at their rear ends, but bent apart at their forward ends, so as to form braces for keeping the front ends of beams which carry the shovels in position, they being connected to the beams or to studs secured thereon by means of a rod or rods which pass through them and through the studs.

To the rear ends of the bars D there are pivoted an equal number of shovel-beams, E E, the rear ends of which are bifurcated in order that they may form bearings for shafts E', which pass through them and carry the rollers E$^2$ E$^2$.

Between the points of the beams E, and just in front of the rollers E$^2$ E$^2$, there are secured standards E$^3$ E$^3$, the lower ends of which constitute the furrow-openers; or they may be provided with a plate of steel or iron for that purpose, they being by preference made hollow, so that the grain may be passed down through them. It may, however, be conducted from the grain-box to the proper point of delivery through flexible hose if that method should be preferred. To the lower end of each of the shovels, or the standards to which they are attached, there is secured a cutter, E$^4$, the front edge of which is to be so sharpened as to cause it to cut through any weeds, grass, or other like substance that may gather there, and thus prevent the shovels from being lifted out of the earth thereby. The front edges of these cutters are, by preference, curved, as shown. They may, however, be straight and set at a proper angle to produce the desired effect, or they may be circular in form and properly secured to the standards E$^3$, in which case they will be the equivalent of those herein described. In the form shown their upper ends are firmly secured to the beams E, as a consequence of which, and of the fact that their lower ends are firmly secured to the shovels or to their standards, and they in turn to the beams E, the shovels will be raised automatically upon their front edges coming in contact with any fixed obstruction, and this will occur independently of the mechanism, soon to be described, for simultaneously raising the whole of the shovels, provision being made for their separate vertical movement, as just described, by pivoting to the beams E at the proper point rods of metal F, which carry each a spring, F', and have their upper ends supported by a beam, F$^2$, which extends from side to side of the frame, and is provided with openings for the passage of the rods, said openings being elongated in the direction of the travel of the machine, as shown in Fig. 2, in order that as the shovels are raised by contact with obstructions the rods shall not bend in the beam, and thus be prevented from rising.

The rollers E$^2$ E$^2$, above alluded to as being carried in the rear bifurcated ends of beams E E, are for the purpose of breaking and pulverizing any clods of earth that may fall into the furrows behind the shovels, and more particularly for compacting the earth upon the grain after it has been deposited in the furrows, and for leaving a depression or groove in the ground, so that as rain falls after the sowing it shall tend to carry a quantity of earth inward and deposit it on the grain, and not to wash it away and leave the grain exposed to the rays of the sun, and to be picked up and carried away by birds, as is done when the present forms of drills are used. There may be any desired number of these rollers, according to the width to be given to the drill, the number always corresponding to the number of shovels, and their outer surfaces on their peripheries may be of the form shown, or may be corrugated or grooved, or made of any other form that will properly compact the earth and leave the required channel or groove in the surface thereof.

When this machine is in operation much the largest portion of its weight will rest upon the shovels and the cutters attached thereto, as the entire weight of the frame and of the rollers will rest thereon, the weight of the frame being communicated through the rods F and springs F', and that of the rollers through the beams E; and as the points of the shovels and of the cutters when in use are at a lower level than the lower surfaces of the rollers, it follows that said rollers will only carry so much of the weight as is contained in them and a small portion of that of the beams, and especially will this be the case when the shovels enter the earth sufficiently far to form a furrow of the required depth.

When it is desired to form a very shallow furrow or to remove the shovels from contact with the earth, it may be done by throwing all of the machine upon the rollers, at which times it may be moved from place to place without allowing the shovels and cutters to come in contact with the earth. To accomplish this it is only necessary to move rearward the outer end of lever $C^2$, which will act through a rod connecting it with the tumbling-beam C, and thereby cause said beam to be tilted in such a manner as to produce an upward movement of its front edge and of the chains G, which extend therefrom down to and are connected with the beams E, the result of which will be to lift the shovels to the required height and to throw the weight upon the rollers, as above described.

When it is necessary to form a shallow furrow the lever $C^2$ is moved through a smaller space and held in position by any suitable device, when the shovels will be raised to such a distance as to remove a portion of the weight therefrom and cause it to rest upon the rollers, and thus a shallow furrow will be formed.

As a matter of convenience there is attached to the front end of the frame a rod, H, which is made to turn freely thereon and to stand out beyond said frame for such a distance as will cause it to serve as a guide in driving the team, its free end being allowed to run in the groove left in the ground by the passage of the machine, which will give the same distance between the furrows formed by the outer roller at the previous passage and the opposite roller in the present passage as there is between the different rollers.

It is obvious that in a machine of this type no carrying-wheels are required, and also that it is less expensive than the forms now in use.

Having thus described my invention, what I claim, and desire to secure by Letters Patent, is—

1. A grain-drill combining in its construction a frame for supporting the operating parts, a series of hoes or furrow-openers carried upon jointed rods and having a vertically-adjustable movement, a series of rotating seed-coverers arranged in the rear of the furrow-openers, a seed-box, and a series of feeding-wheels and suitable mechanism for driving them, the construction and arrangement of the parts being substantially such as are herein described, whereby the carrying-wheels usually employed for carrying grain-drills are dispensed with and the weight of the machine is made to rest mainly upon the furrow-openers, as described.

2. In a grain-drill the weight of which rests upon the shovels or furrow-openers, a series of jointed vertically-moving drag-bars and a series of compacting-rollers having their journals placed in bearings formed in the drag-bars, they being arranged substantially as set forth, whereby they are made to follow in the path of the hoes or furrow-openers and to leave a channel in the earth below its general level, as set forth, and for the purpose specified.

3. In a grain-drill the weight of which rests mainly upon the shovels which form the furrows for the reception of the grain, a series of curved cutters the lower ends of which are secured to the points of the shovels, or to the standards which carry them, and their upper ends to swinging beams, substantially as and for the purpose set forth.

4. In a grain-drill the weight of which rests mainly upon the shovels which form the furrows for the reception of the grain, a series of springs arranged substantially as shown and described, whereby they are made to communicate or transfer the weight of the frame of the machine, substantially as set forth.

5. In a grain-drill the weight of which rests mainly upon the shovels which form the furrows for the reception of the grain, the combination of the frame A A and A', the bars D, beams E, and rollers $E^2$, the parts being constructed and arranged for joint operation substantiallly as set forth.

6. The combination of the frame A A A', the bars D, attached to the frame, the beams E, rollers $E^2$, shovels $E^3$, cutters $E^4$, rods F, springs F', slotted beam $F^2$, lever $C^2$, tumbling-beam C, and chain G, the parts being arranged for regulating the depth of the furrows and for throwing the weight of the machine upon the rollers, substantially as set forth.

In testimony whereof I affix my signature in presence of two witnesses.

ROBERT C. MORRIS.

Witnesses:
SAM J. BAKER,
J. C. HERON.